US012646718B2

(12) United States Patent (10) Patent No.: US 12,646,718 B2

Hwang et al. (45) Date of Patent: Jun. 2, 2026

(54) NEGATIVE ELECTRODE ACTIVE MATERIAL AND SECONDARY BATTERY INCLUDING THE SAME

(71) Applicant: SK On Co., Ltd., Seoul (KR)

(72) Inventors: Hae Suk Hwang, Daejeon (KR); Jong Hyuk Lee, Daejeon (KR); Hee Gyoung Kang, Daejeon (KR); So Hyun Park, Daejeon (KR); Chan Young Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 609 days.

(21) Appl. No.: 17/724,464

(22) Filed: Apr. 19, 2022

(65) Prior Publication Data

US 2022/0344661 A1 Oct. 27, 2022

(30) Foreign Application Priority Data

Apr. 22, 2021 (KR) ........................ 10-2021-0052473

(51) Int. Cl.
| | |
|---|---|
| *H01M 4/587* | (2010.01) |
| *H01M 4/133* | (2010.01) |
| *H01M 4/36* | (2006.01) |
| *H01M 4/583* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/587* (2013.01); *H01M 4/133* (2013.01); *H01M 4/364* (2013.01); *H01M 4/366* (2013.01); *H01M 4/583* (2013.01);

*H01M 4/625* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2010/0273058 | A1* | 10/2010 | Lee ........................ | H01M 4/587 |
| | | | | 252/182.1 |
| 2014/0027679 | A1* | 1/2014 | Kim ........................ | H01M 4/485 |
| | | | | 423/598 |
| 2015/0104711 | A1* | 4/2015 | Waki ..................... | H01M 4/625 |
| | | | | 252/182.1 |
| 2018/0190985 | A1* | 7/2018 | Choi .................... | H01M 10/052 |
| 2018/0366786 | A1* | 12/2018 | Fujii ........................ | H01M 4/13 |
| 2019/0229325 | A1* | 7/2019 | Ahn ........................ | H01M 4/366 |
| 2019/0326600 | A1* | 10/2019 | Park .................... | H01M 10/052 |
| 2020/0295351 | A1* | 9/2020 | Piao .................. | H01M 10/0525 |
| 2021/0126248 | A1* | 4/2021 | Choi .................... | H01M 4/587 |

FOREIGN PATENT DOCUMENTS

| | | |
|---|---|---|
| KR | 10-1953757 B1 | 3/2019 |
| KR | 10-2069221 B1 | 1/2020 |
| KR | 10-2020-0085587 A | 7/2020 |

* cited by examiner

*Primary Examiner* — Mary Grace Byram

(74) *Attorney, Agent, or Firm* — IP & T GROUP LLP

(57) ABSTRACT

Provided is a negative electrode active material for a secondary battery including an active material in a bimodal form including small particles and large particles, in which the small particles are primary particles, and the large particles are secondary particles formed by granulating the primary particles.

8 Claims, No Drawings

NEGATIVE ELECTRODE ACTIVE MATERIAL AND SECONDARY BATTERY INCLUDING THE SAME

CROSS-REFERENCE TO RELATED APPLICATIONS

This application claims priority under 35 U.S.C. § 119 to Korean Patent Application No. 10-2021-0052473, filed on Apr. 22, 2021, in the Korean Intellectual Property Office, the disclosure of which is incorporated herein by reference in its entirety.

TECHNICAL FIELD

The following disclosure relates to a negative electrode active material for a secondary battery and a secondary battery including the same.

BACKGROUND

With the global warming issue, which is a problem in modern society, the demand for eco-friendly technologies is rapidly increasing. In particular, as the technological demand for an electric vehicle and an energy storage system (ESS) increases, the demand for lithium secondary batteries, which are spotlighted as energy storage devices, is also increasing explosively. Therefore, studies to improve the high-output and high-capacity characteristics of the lithium secondary batteries are being conducted.

In the early stage, lithium metal has been mainly used as a negative electrode material for lithium secondary batteries. However, as the charging and discharging progress, a separator is damaged due to growth of lithium atoms on a surface of metal lithium. In recent years, carbon-based materials have been mainly used. Among the carbon-based materials, graphite, which has an advantage of a relatively low price and a long service life, has been the most used. However, the graphite has a very small interlayer distance of 0.335 nm, has fewer sites for lithium ions to be inserted, and has a long diffusion distance through between a graphite basal plane, so its capacity is limited to 372 mAh/g. In addition, since the graphite has a plate-like structure, the graphite has the problems of low packing density and poor grain orientation during the manufacturing of the electrode, and so an insertion rate of lithium ions is slow. As a result, the graphite may not satisfy high output characteristics. In particular, when a resistance between the carbon-based materials increases while the carbon-based materials are stored for a long period of time at a high temperature, an internal resistance of a negative electrode including the carbon-based materials increases. As a result, there is a problem in that capacity and output characteristics are significantly reduced.

Accordingly, there is a need to develop a negative electrode active material capable of improving lifespan characteristics by suppressing deterioration due to high-temperature storage while exhibiting high capacity and high output.

SUMMARY

An embodiment of the present invention is directed to providing a negative electrode active material for improving high-temperature storage and lifespan characteristics while efficiently exhibiting fast charging performance.

In one general aspect, a negative electrode active material for a secondary battery includes: an active material in a bimodal form including small particles and large particles.

The small particles are primary particles, and the large particles are secondary particles formed by granulating the primary particles.

The large particles may include a carbon coating layer on a surface of the secondary particles.

The carbon coating layer may be an amorphous carbon coating layer.

A thickness of the carbon coating layer may be 1 to 100 nm.

The small particles may not include a carbon coating layer.

The primary particles of the small particles and the primary particles of the large particles may each independently be natural graphite, artificial graphite, or a combination thereof.

The primary particles of the small particles and the primary particles of the large particles may be artificial graphite.

The small particles may have a particle diameter (D50) of 20 to 90% with respect to a particle diameter (D50) of the large particles.

The small particles may have the particle diameter (D50) of 25 to 80% with respect to the particle diameter (D50) of the large particles.

A weight ratio of the small particles and the large particles may be 1:1.5 to 1:3.

In another general aspect, a negative electrode for a secondary battery includes the negative electrode active material described above.

In still another general aspect, a secondary battery includes: the negative electrode described above; a positive electrode; a separator positioned between the negative electrode and the positive electrode; and an electrolyte.

DETAILED DESCRIPTION OF EMBODIMENTS

Various advantages and features of the present invention and methods accomplishing them will become apparent from the following description of exemplary embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Hereinafter, exemplary embodiments of the present invention will be described in detail with reference to the accompanying drawings. Like reference numbers refer to like elements irrespective of the drawings, and "and/or" includes each and every combination of one or more of the mentioned items.

Unless defined otherwise, all terms (including technical and scientific terms) used in the present specification have the same meaning as meanings commonly understood by those skilled in the art to which the present invention pertains. Throughout the present specification, unless described to the contrary, "including" any component will be understood to imply the inclusion of other elements rather than the exclusion of other elements. In addition, a singular form includes a plural form unless specially described in the text.

Throughout the present specification, it will be understood that when an element such as a layer, a film, a region, or a substrate is referred to as being "on" or "over" another element, it may be directly on another element or may have an intervening element present therebetween.

In the present specification, a particle diameter may mean D50, and the D50 means a particle diameter when a cumulative volume becomes 50% from a small particle diameter in particle size distribution measurement by a laser scattering method. Here, D50 can be derived according to the result of measuring the particle size distribution using Malvern's Mastersizer3000 by taking a sample according to KS A ISO 13320-1 standard. Specifically, after performing a dispersion using ethanol as a solvent and, if necessary, using an ultrasonic disperser, a volume density of particles may be measured.

The present invention provides a negative electrode active material for a secondary battery including an active material in a bimodal form including small particles and large particles, in which the small particles are primary particles, and the large particles are secondary particles formed by granulating the primary particles.

The negative electrode active material for a secondary battery according to the present invention includes the active material in the bimodal form including the primary particles that are the small particles and the secondary particles that are the large particles formed by granulating the primary particles. Accordingly, it is possible to efficiently exhibit a structure in which the small particles are located between the large particles, so a high-density negative electrode may be implemented by improving bulk density and rollability of a negative electrode including the small particles, and furthermore, the resistance of the negative electrode may be significantly reduced. In this case, the primary particles mean original particles when a different type of particles are formed from a certain particle, and a plurality of primary particles may be aggregated, combined, or granulated to form the secondary particles.

Meanwhile, when both the large particles and the small particles are the secondary particles, a size of the secondary particles of the small particles that can be granulated is substantially limited, and thus, it is difficult to efficiently exhibit the above-described structure. On the other hand, when both the large particles and the small particles are the primary particles, the resistance of the negative electrode may increase due to the high resistance of the primary particles of the large particles.

A weight ratio of the small particles and the large particles in the negative electrode active material may be 1:1.5 to 1:3, preferably 1:2 to 1:3, and more preferably 1:2 to 1:2.5. In the above range, it is possible to suppress the increase in side reactions with the electrolyte due to a large specific surface area of the small particles, thereby suppressing the problem of the reduction in capacity.

The small particles may have a particle diameter (D50) of 20 to 90%, preferably 25 to 80% with respect to a particle diameter (D50) of the large particles. Specifically, the particle diameters (D50) of the primary particles of the small particles and the primary particles of the large particles may each independently be 2 to 15 μm, preferably 2 to 10 μm, and more preferably 5 to 10 μm. Within the above range, a specific surface area of the secondary particles granulated and then formed excessively increases to facilitate insertion and desorption of lithium ions while suppressing the problem of the reduction in capacity due to the increase in side reactions with the electrolyte, thereby improving fast charging performance.

The primary particles of the small particles and the primary particles of the large particles are each independently natural graphite, artificial graphite, or a combination thereof, and preferably artificial graphite. The artificial graphite may manufacture a relatively high-density electrode due to its high particle strength, and thus, increase the capacity density per volume of the negative electrode and contribute to the improvement of the lifespan characteristics of the battery. However, the present invention is not necessarily limited thereto.

The secondary particles refer to physically distinguishable large particles formed by aggregation, combination, or granulation of individual primary particles. The granulation of the primary particles refers to a process in which the primary particles are spontaneously or artificially aggregated or conglomerated to form an aggregate including a plurality of primary particles, and thus, become the secondary particles, and may be used interchangeably with terms such as aggregate or combination.

A carbon coating layer may be formed on the surface of the secondary particles of the large particles, and specifically, the carbon coating layer may be an amorphous carbon coating layer. By including the amorphous carbon coating layer on the surface of the secondary particles, it is possible to improve conductivity and increase the fast charging performance by the lithium ion adsorption of the coating layer. In this case, a coating rate of the amorphous carbon coated on the secondary particles may be 60% or more, preferably 80% or more, and more preferably 90% or more, with respect to the surface area of the secondary particles.

The method of coating the amorphous carbon on the surface of the secondary particles may be performed through a method commonly known in the art, and as a non-limiting example, after attaching or coating an amorphous carbon precursor material to the secondary particles, heat treatment may be performed. Specifically, the amorphous carbon precursor material may be at least one selected from the group consisting of petroleum heavy oil and pitch oil.

The thickness of the carbon coating layer on the surface of the secondary particles may be 1 to 100 nm, preferably 1 to 50 nm, and more preferably 1 to 10 nm. When the thickness of the carbon coating layer is 1 nm or less, the effect of increasing conductivity cannot be exhibited due to an excessively thin coating thickness, and when the thickness of the carbon coating layer is 100 nm or more, long-term life characteristics may be rapidly reduced due to the side reaction with the carbon coating layer and the electrolyte.

The particle diameter of the large particles including the carbon coating layer may be 10 to 20 μm and preferably 13 to 20 μm.

According to one implementation example of the present invention, among the small particles and large particles in the negative electrode active material, the small particles do not include a carbon coating layer, and the above-described carbon coating layer may be formed only on the surface of the secondary particle of the large particles. Specifically, when the carbon coating layer is formed on the surface of the small particles, it is difficult to form a uniform coating layer, and the phenomena such as aggregation of particles may occur in the coating process to degrade the performance of the negative electrode including the coating layer.

Accordingly, by selectively forming the carbon coating layer only on the large particles of the secondary particles, problems such as gas generation and performance degradation due to the side reaction between the functional group and the electrolyte present on the surface of the secondary particles are suppressed, so it is possible to improve long-term performance stability at a high temperature of particularly 50° C. or higher, specifically 60° C. or higher.

The present invention also provides a negative electrode for a secondary battery including the negative electrode active material according to one implementation example of the present invention. Specifically, the negative electrode includes a current collector, and a negative electrode active material layer including the negative electrode active material, a conductive material, and a binder positioned on the current collector.

As the current collector, a current collector selected from the group consisting of copper foil, nickel foil, stainless steel foil, titanium foil, nickel foam, copper foam, a polymer substrate coated with conductive metal, and combinations thereof may be used, but the present invention is not limited thereto.

The binder is not particularly limited as long as it is the existing binder capable of adhering the electrode active material well to the current collector while adhering the electrode active material particles well to each other. For example, the binder is an aqueous binder, specifically styrene-butadiene rubber, acrylated styrene-butadiene rubber, polyvinyl alcohol, sodium polyacrylate, a copolymer of propylene and olefin having 2 to 8 carbon atoms, a copolymer of (meth)acrylic acid and (meth)acrylic acid alkyl ester, or a combination thereof.

When using the aqueous binder, the aqueous binder may bind the electrode active material well to the current collector without affecting viscosity of slurry, but as the slurry may be easily gelled due to the electrode active material and the conductive material which are fine particles, may further include a thickener for imparting viscosity to the slurry to prepare stable slurry. For example, as the thickener, a mixture of one or more of a cellulose-based compound, specifically, carboxymethyl cellulose, hydroxypropylmethyl cellulose, methyl cellulose, alkali metal salts thereof, or the like may be used. As the alkali metal, Na, K, or Li can be used.

The conductive material is used to impart conductivity to the electrode, and any conductive material can be used as long as it does not cause a chemical change in the constituted battery and is an electrically conductive material. Examples of the conductive material may include: carbon-based materials such as natural graphite, artificial graphite, carbon black, acetylene black, ketjen black, and carbon fiber; metal-based substances such as metal powders such as copper, nickel, aluminum, and silver, or metal fiber, conductive polymers such as polyphenylene derivatives; or a conductive material containing a mixture thereof.

The present invention provides a secondary battery including the negative electrode, a positive electrode, a separator positioned between the negative electrode and the positive electrode, and an electrolyte.

The negative electrode is the same as described above.

The positive electrode includes a current collector and a positive electrode active material layer formed by applying positive electrode slurry containing a positive electrode active material to the current collector.

As the current collector, the above-described negative electrode current collector may be used, and the materials known in the art may be used, but the present invention is not limited thereto.

The positive electrode active material layer may include a positive electrode active material, and optionally further include a binder and a conductive material. As the positive active material, the known positive active materials known in the art may be used. For example, it is preferable to use a composite oxide of lithium and a metal selected from cobalt, manganese, nickel, and combinations thereof, but the present invention is not limited thereto.

As the binder and the conductive material, the above-described negative electrode binder and negative electrode conductive material may be used, and any known material in the art may be used, but the present invention is not limited thereto.

The separator may be a separator selected from, for example, glass fiber, polyester, polyethylene, polypropylene, polytetrafluoroethylene, or a combination thereof, and may be in the form of a nonwoven fabric or a woven fabric. For example, a polyolefin-based polymer separator such as polyethylene or polypropylene may be mainly used for a lithium secondary battery, and a separator coated with a composition containing a ceramic component or a polymer material may be used to secure heat resistance or mechanical strength, and may be used optionally in a single-layer or multi-layer structure. The separator known in the art may be used, but the present invention is not limited thereto.

The electrolyte contains an organic solvent and a lithium salt.

The organic solvent serves as a medium through which ions involved in the electrochemical reaction of the battery may move. As the organic solvent, for example, a carbonate-based, ester-based, ether-based, ketone-based, alcohol-based, or aprotic solvent may be used. The organic solvent may be used alone or in a mixture of two or more. When the organic solvent of a mixture of two or more is used, a mixing ratio may be appropriately adjusted according to the desired battery performance. On the other hand, the organic solvent known in the art may be used, but the present invention is not limited thereto.

The lithium salt is a material that is dissolved in an organic solvent, acts as a source of lithium ions in the battery, enables an operation of a basic lithium secondary battery, and promotes movement of lithium ions between the positive electrode and the negative electrode. Examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO3$, $LiClO_4$, $LiAlO_2$, $LiAlCl_4$, $LiN(C_xF_{2x+1}SO_2)(C_yF_{2y-1}SO_2)$(x and y are natural number), $LiCl$, $LiI$, $LiB(C_2O_4)_2$, or a combination thereof, but the present invention is not limited thereto.

The concentration of the lithium salt may be used within the range of 0.1M to 2.0M. When the concentration of the lithium salt is within the above range, since the electrolyte has appropriate conductivity and viscosity, excellent electrolyte performance may be exhibited, and lithium ions may move effectively.

In addition, the electrolyte may further contain pyridine, triethyl phosphate, triethanolamine, cyclic ether, ethylene diamine, n-glyme, hexaphosphoric acid triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride, or the like to improve charging/discharging characteristics, flame retardant properties, and the like, if necessary. In some cases, the electrolyte may further contain halogen-containing solvents such as carbon tetrachloride and ethylene trifluoride to impart incombustibility, and may further include fluoro-ethylene carbonate (FEC), propene sulfone (PRS), fluoro-propylene carbonate (FPC), and the like to improve the high temperature storage properties.

Hereinafter, Inventive Example and Comparative Examples are described. However, Inventive Example is only an exemplary embodiment of the present invention, and the present invention is not limited to Inventive Example.

EXAMPLES

Example 1

Step 1: Preparation of Negative Electrode Active Material

After grinding needle coke, powder was heat-treated at 3000° C. for 20 hours to prepare primary particles of artificial graphite having an average particle diameter (D50) of 7.5 μm.

After the primary particles of artificial graphite were mixed with a pitch at 95:5, the mixture was heat-treated at 800° C. for 10 hours to prepare secondary particles in which the primary particles are granulated, and then the secondary particles were heat-treated at 3000° C. for 20 hours to prepare secondary particles of artificial graphite having an average particle diameter (D50) of 16 μm.

The prepared primary particles and secondary particles of artificial graphite were mixed in a weight ratio of 3:7 to prepare a negative electrode active material.

Step 2: Preparation of Negative Electrode

Water was added to 93.4 wt% of the negative electrode active material, 3.0 wt% of carbon black conductive agent, 2.4 wt% of SBR binder, and 1.2 wt% of CMC, and they were mixed at room temperature for 120 minutes to prepare slurry. The prepared slurry was applied to a Cu foil current collector and dried, and then rolled so that a negative electrode mixture density is 1.7 g/cc to prepare a negative electrode.

Step 3: Manufacturing of Half Cell

After interposing a PE separator between the prepared negative electrode, a lithium metal positive electrode, a negative electrode, and a positive electrode, an electrolyte was injected to manufacture a CR2016 coin cell. A half cell was prepared by resting the assembled coin cell at room temperature for 24 hours. In this case, as the electrolyte, an electrolyte in which a lithium salt 1.0M $LiPF_6$ was mixed with an organic solvent (EC:EMC=3:7 Vol %), and 1 Vol % of the electrolyte additive FEC was mixed was used.

Evaluation Example: High Temperature Performance Evaluation according to Types of Small particles and Large particles

Example 2

An evaluation example was performed in the same manner as in Example 1 except that, in the step 1, a negative electrode active material is prepared by using, as large particles, secondary particles (average particle diameter (D50) of 16 μm) of artificial graphite in which a coating layer having a residual carbon content of 1% and an average thickness of 10 nm is formed by using a pitch as a coating agent.

Examples 3 and 4

Examples 3 and 4 were performed in the same manner as in Example 2 except that a carbon coating layer was formed under conditions shown in Table 1 below. In this case, an average particle diameter (D50) of small particles or large particles refers to an average particle diameter of particles (primary particles or secondary particles) after a carbon coating layer is formed, and was adjusted to be 7.5 μm and 16 μm, respectively.

Comparative Example 1

Comparative Example 1 was performed in the same manner as in Example 4 except that, in the step 1, small particles of natural graphite having an average particle diameter of 10 μm were used instead of primary particles of artificial graphite, and large particles of natural graphite having an average particle diameter of 18 μm were used instead of secondary particles of artificial graphite. In this case, both the small particles and large particles of natural graphite are the secondary particles, and the average particle diameter (D50) refers to the average particle diameter of particles after the carbon coating layer is formed.

Comparative Example 2

Comparative Example 2 was performed in the same manner as in Comparative Example 1 except that, in the Comparative Example 1, secondary particles (average particle diameter (D50) 16 μm) of artificial graphite, in which a carbon coating layer is formed, instead of large particles of natural graphite were used.

Output Resistance Evaluation

A process of stabilizing an electrode by charging and discharging half cells prepared in Examples 1 to 4 and Comparative Examples 1 to 2 at a low rate (0.1 C) during initial 5 cycles was performed. In this case, in the discharge process of 4 cycles, the resistance at the time of SOC 50% was measured using TOSCAT-3100 of TOYO, and the results were shown in Table 1 below.

High Temperature Performance Evaluation

The half cells prepared in Examples 1 to 4 and Comparative Examples 1 and 2 were charged and discharged at 0.1 C for the initial 3 cycles, and then were charged with SOC 100% and placed in a constant temperature chamber at 60° C. After 4 weeks, the half cell was charged and discharged at a rate of 2C for 100 cycles, and then charged again with SOC 100% and placed in the constant temperature chamber at 60° C. The above process was repeated 3 times at intervals of 4 weeks to perform the charging and discharging for a total of 300 cycles, a capacity retention rate for 300 cycles compared to discharge capacity in a first cycle was measured, and average discharge capacity of 300 cycles was calculated and shown in Table 1 below.

TABLE 1

| | Small particles | | Large particles | | | | Capacity |
| | Type | Carbon coating layer | Type | Carbon coating layer | DC IR (Ohm) | Discharging capacity (mAh/g) | retention rate (%) |
| --- | --- | --- | --- | --- | --- | --- | --- |
| Example 1 | Primary particle of artificial graphite | X | Secondary particle of artificial graphite | X | 1.22 | 334 | 94 |

TABLE 1-continued

| | Small particles | | Large particles | | | | Capacity |
|---|---|---|---|---|---|---|---|
| | Type | Carbon coating layer | Type | Carbon coating layer | DC IR (Ohm) | Discharging capacity (mAh/g) | retention rate (%) |
| Example 2 | Primary particles of artificial graphite | X | Secondary particles of artificial graphite | ○ | 1.02 | 341 | 96 |
| Example 3 | Primary particles of artificial graphite | ○ | Secondary particles of artificial graphite | X | 1.10 | 320 | 90 |
| Example 4 | Primary particles of artificial graphite | ○ | Secondary particles of artificial graphite | ○ | 1.02 | 335 | 91 |
| Comparative Example 1 | Small particles of natural graphite | ○ | Large particles of natural graphite | ○ | 1.02 | 309 | 87 |
| Comparative Example 2 | Small particles of natural graphite | ○ | Secondary particles of artificial graphite | ○ | 1.03 | 316 | 89 |

Referring to Table 1, it was confirmed that long-term performance at high temperature was significantly improved when the primary and secondary particles of the same material were provided and the amorphous carbon coating layer was selectively formed only on the secondary particles (large particles).

Specifically, in the case of Example 1 in which neither the small particles nor the large particles include the carbon coating layer, relatively excellent discharge capacity and capacity retention rate characteristics were exhibited, but in the case of Examples 3 and 4, the aggregation of the particles occurred while the carbon coating layer is formed on the small particles, or the coating layer was not formed uniformly, so it is determined that the performance was rather reduced.

On the other hand, in the case of Example 2, by selectively forming the carbon coating layer only on the secondary particles which are large particles, the surface of the secondary particles is stabilized according to the formation of a uniform coating layer, so compared to Examples 3 and 4, the stability at high temperature was increased, and the significant lifespan characteristics were exhibited without deterioration due to high temperature storage.

In Comparative Examples 1 and 2, both the small particles and the large particles are the secondary particles, and since the small particles and the large particles contain natural graphite, it may be confirmed that the lifespan characteristics at a high temperatures are inferior.

According to the present invention, a negative electrode active material for a secondary battery may implement a high-density negative electrode, thereby exhibiting excellent capacity characteristics and improving fast charging performance.

In addition, by suppressing an increase in resistance between negative electrode active materials due to high-temperature storage for a long period of time, it is possible to improve lifespan characteristics of a battery.

Although the exemplary embodiments of the present invention have been described above, the present invention is not limited to the above exemplary embodiments, but may be manufactured in a variety of different forms, and those of ordinary skill in the art to which the present invention pertains will understand that the present invention may be implemented in other specific forms without changing the technical spirit or essential features of the present invention. Therefore, it is to be understood that the exemplary embodiments described hereinabove are illustrative rather than being restrictive in all aspects.

What is claimed is:

1. A negative electrode active material for a secondary battery, comprising:

an active material in a bimodal form including small particles and large particles, wherein the small particles are primary particles, and the large particles are secondary particles formed by granulating the primary particles, wherein particle diameters (D50) of the small particles are 5 to 10 μm, wherein the large particles include a carbon coating layer on a surface of the secondary particles, wherein the primary particles of the small particles and the primary particles of the large particles are artificial graphite, wherein a weight ratio of the small particles and the large particles is 1:1.5 to 1:3.

2. The negative electrode active material of claim 1, wherein the carbon coating layer is an amorphous carbon coating layer.

3. The negative electrode active material of claim 1, wherein the small particles do not include a carbon coating layer.

4. The negative electrode active material of claim 1, wherein the small particles have a particle diameter (D50) of 20 to 90% with respect to a particle diameter (D50) of the large particles.

5. The negative electrode active material of claim 4, wherein the small particles have the particle diameter (D50) of 25 to 80% with respect to the particle diameter (D50) of the large particles.

6. A negative electrode for a secondary battery comprising the negative electrode active material of claim 1.

7. A secondary battery, comprising:

the negative electrode of claim 6.

8. The negative electrode active material of claim 1, wherein a thickness of the carbon coating layer is 1 to 100 nm.

\* \* \* \* \*